Oct. 11, 1966

A. E. SEED 3,277,995

SEGREGATION APPARATUS

Filed Nov. 18, 1964

INVENTOR.
ANIESE E. SEED

BY

Thomas H. Grafton
ATTORNEY

Fig. 5

Oct. 11, 1966    A. E. SEED    3,277,995
SEGREGATION APPARATUS
Filed Nov. 18, 1964    6 Sheets-Sheet 4

Fig. 6

INVENTOR.
ANIESE E. SEED
BY
Thomas H. Grafton
ATTORNEY

INVENTOR.
ANIESE E. SEED
BY
Thomas H. Grafton
ATTORNEY

Oct. 11, 1966  A. E. SEED  3,277,995

SEGREGATION APPARATUS

Filed Nov. 18, 1964  6 Sheets-Sheet 6

INVENTOR.
ANIESE E. SEED

BY

Thomas H. Grafton
ATTORNEY

United States Patent Office 3,277,995
Patented Oct. 11, 1966

3,277,995
SEGREGATION APPARATUS
Aniese E. Seed, Toledo, Ohio, assignor to Toledo Scale Corporation, Toledo, Ohio, a corporation of Ohio
Filed Nov. 18, 1964, Ser. No. 411,989
16 Claims. (Cl. 198—31)

This invention relates to checkweigher systems and more particularly to apparatus for sorting articles.

Segregation or rejection systems which have heretofore been known, such as disclosed in U.S. Patent No. 3,009,572 issued November 21, 1961, in the name of P. E. Seaborn, U.S. Patent No. 3,093,245 issued June 11, 1963, in the names of L. E. Worcester and R. L. Underwood, and U.S. Patent No. 3,129,803 issued April 21, 1964, in the names of J. D. Giulie and C. F. Peasley, have the problem of collisions between the pins on the segregating article carriers and the ends of cam tracks that guide the pins and thus the article carriers into under weight and over weight paths.

In the above U.S. Patent No. 3,009,572, in the Fig. 1 species, flexible gates guide the cam-track-following pins on the article carriers each into one of three tracks in a stationary switch plate. A late signal to the mechanism which operates the gates can result in positioning a carrier pin in line with a solid portion of the switch plate resulting in a collision which will break the pin. In the Fig. 9 species in such patent, two gates are rotated upwardly to deflect the article carriers into the proper segregating channels. If a gate drops prematurely, a carrier pin may collide with an open end of a cam track. In the Fig. 14 species in such patent, two gates are rotated upwardly to be received between pins (four pins on each article carrier) on the article carriers to deflect the carriers into the proper segregating channels. If a gate drops prematurely, a carrier pin may collide with an open end of a cam track. In the Fig. 17 species in such patent, two gates swing about vertical axes to deflect the article carriers into the proper segregating channels. Operation of the gates at the wrong time can result in a collision of a carrier with an open end of a cam track. In order to guard against these collisions, a control circuit (Figs. 5 and 6) is provided which permits actuation of the switching mechanism only when the beams to both the photocells 160 and 170 are broken simultaneously. A modified control circuit is shown in Fig. 7 which operates similarly. No such control circuit is needed in the apparatus of the invention, the design being such that collisions of the carrier pins with the mouths of cam track entrances are impossible.

In the above U.S. Patents Nos. 3,093,245 and 3,129,803 no timing controls are used to prevent the above collisions. Late signals to the segregating solenoids shown in these patents can result in positioning of the carrier pins in line with the ends of the switching mechanisms.

Accordingly, the objects of this invention are to eliminate the above collisions, to improve sorting apparatus, to provide an improved switching mechanism for such apparatus, to increase the reliability of such apparatus, and to increase the speed of such apparatus.

The above and other objects and features of this invention will be appreciated more fully from the following detailed description when read with reference to the accompanying drawings wherein.

Referring to the drawings, a weighing device which is not shown but which may be like the one shown in the above U.S. Patent No. 3,093,245 feeds check-weighed articles onto the front end 20 of the segregation device which forms the present invention.

The segregation device includes a pair of sprockets mounted for rotation on a shaft 21 which is driven by a belt 22 from a motor 23. A second pair of sprockets is mounted on an idler shaft 24. Endless roller chains 25 are mounted between the sprockets to provide two parallel endless chains movable from the front or loading end 20 toward a discharge end 26 from which the articles, segregated according to weight, are discharged onto three endless belts which are not shown but which are like similar belts shown in the above U.S. Patent No. 3,093,245 for the purpose of conveying articles after they have been segregated. The conveyor moves in a forward path to the discharge end and in a return path to the loading end. Mounted between the chains 25 is a series of smooth, round tubes 27 in an arrangement best shown in FIGS. 5 and 6. As the shaft 21 is driven, the series of tubes 27 form a moving path over which articles are conveyed. The motor 23 is controlled through a box 28 provided with a manually operabe speed changer control knob 29 and an on-off toggle switch 30. The segregation device also includes four legs 31 two of which support a plate 32, carrying the motor 23 and the control box 28, and which support two longitudinally extending vertical side plates 33 carrying bearings 34 which function as journals for the shafts 21 and 24.

Figure 5:
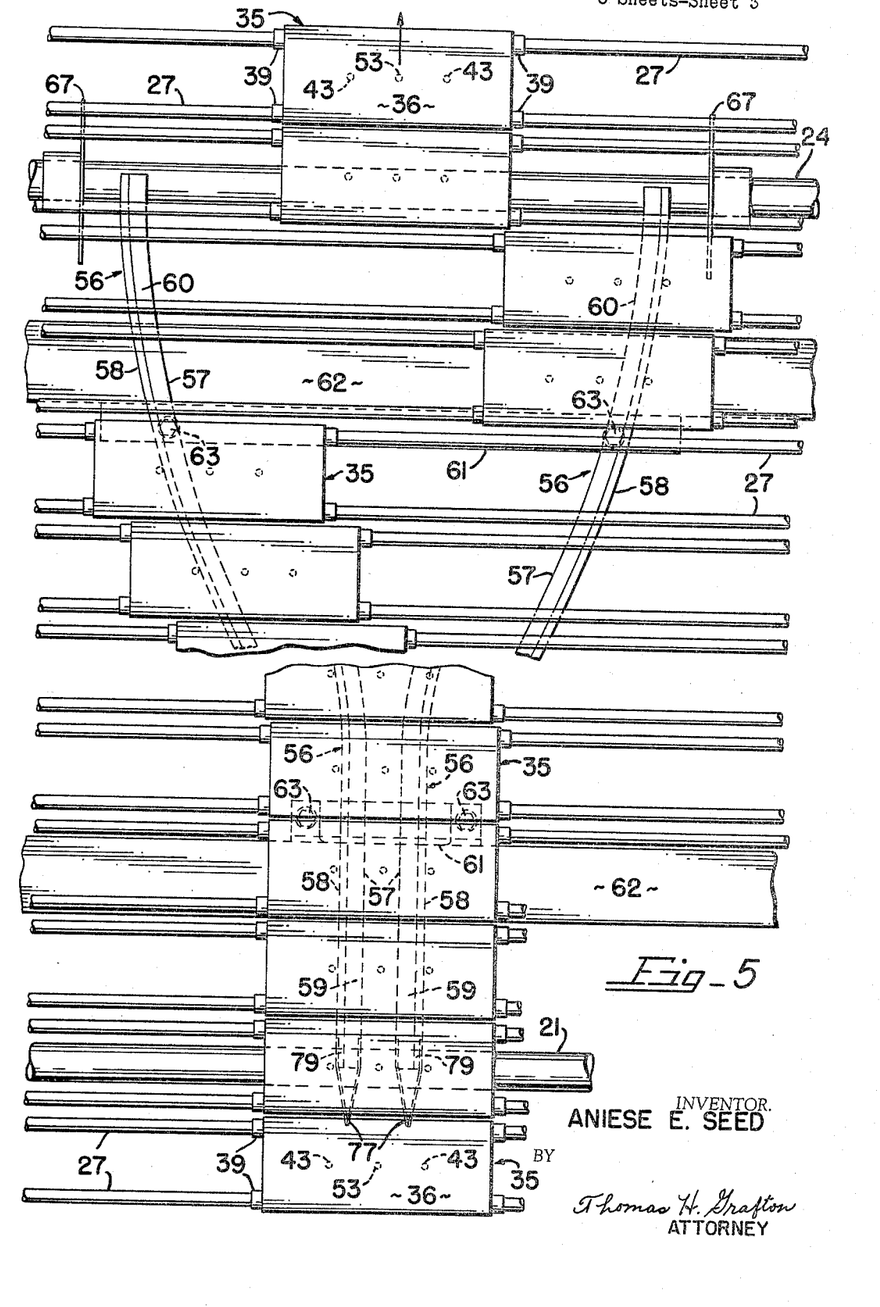
FIG. 5 is an enlarged, fragmentary plan view as seen looking down upon the device shown in FIG. 1 with the article carriers shown in different positions.
Figure 6:
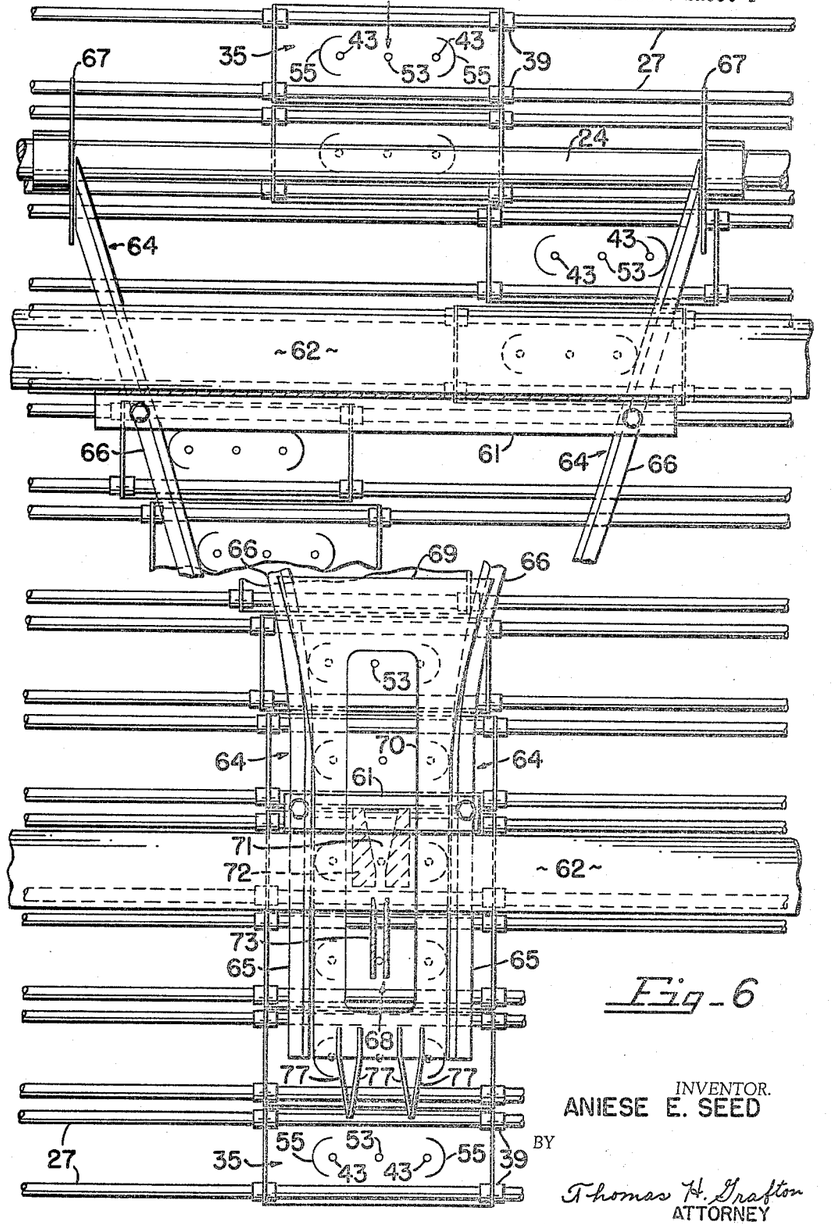
FIG. 6 is an enlarged, fragmentary plan view as seen looking down upon the lower flight of the endless conveyor shown in FIG. 1, with several parts shown in horizontal section.

On pairs of tubes 27, in the arrangement shown in FIGS. 5 and 6, article carriers 35 are free to slide laterally. The carriers 35 each have an upper surface 36 (FIGS. 5 and 7) which serves as a platform to convey the articles. A plurality of the carriers 35, e.g., four, can be used to carry one article. The article carriers 35 are mounted on the conveyor for movement therewith and for lateral movement with respect thereto. Each of the article carriers 35 includes a body member 37 carrying a plate providing the above article-carrying surface 36 and having downwardly bent ends 38 each provided with a pair of bearings 39 which receive the tubes 27, there being two tubes 27 for each of the carriers 35. Each of the carriers 35 defines two cylindrical openings 40 each of which receives a coil spring 41 which is held between a spring retainer 42 and the top of the carrier 35. Each of the spring retainers 42 is connected to a slidable vertical pin 43 having a reduced lower end or cam follower 44, which extends from the carrier 35, and a shoulder 45 at the top of the reduced end 44 as viewed in FIG. 7, the pin 43 extending through a bearing 46 having a press-fit in its respective opening 40. The bearings 46 serve as bearings for the pins 43, define keyways 47 which receive pins 48 carried by the pins 43 to prevent rotation of the pins 43, and have flat bearing surfaces 49 on which a slide 50 slides laterally. The springs 41 urge the end pins 43 toward ejected positions.

Figure 7:
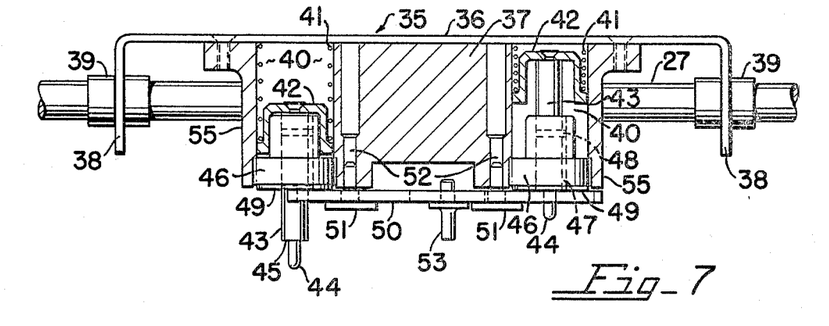
FIG. 7 is an enlarged, front elevational view of one of the article carriers shown incorporated in the device illustrated in FIG. 1, with several parts shown in vertical section.
Figure 8:
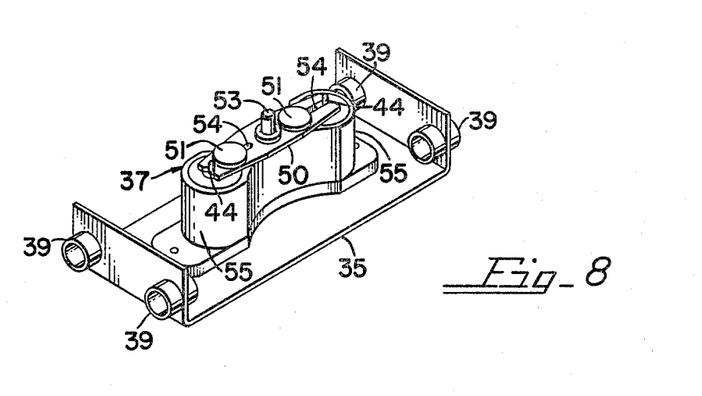
FIG. 8 is a reduced, perspective view of the article carrier shown in FIG. 7 as seen upside down.
Figure 9:
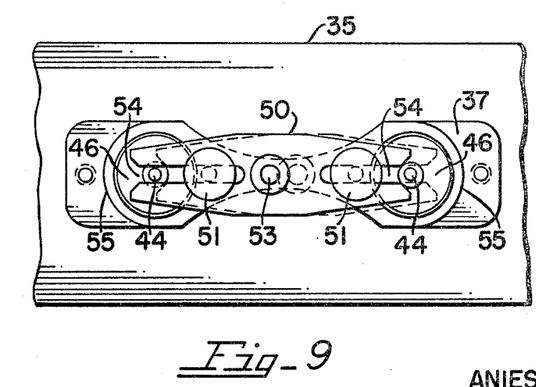
FIG. 9 is an enlarged, fragmentary plan view of the article carrier shown in FIG. 8, with slide mechanism shown in two positions.

The slide 50 also slides on the heads of two retainers 51 and on the cylindrical sides of such retainers, which are press-fitted into openings 52 defined by the body member 37, and carries a center pin 53, the retainers 51 being received in open-ended slots 54 in the slide 50. The slide 50 has a center position shown in FIG. 8, a first side position shown in FIG. 7, and a second side position shown in solid lines in FIG. 9. In the center position, the slide 50 by engagement with the pin shoulders 45 holds the pins 43 in opposition to the springs 41 in the retracted positions of the pins 43 shown in FIG. 8 and in the position of the right hand one of the pins 43 as viewed in FIG. 7. The pin shoulders 45 are urged against the slide 50 by means of the springs 41 holding or latching the slide in place. The slide 50 never touches the reduced pin ends 44, the slots 54 clearing such reduced pin ends 44 when the pin shoulders 45 are engaged by the slide 50. Pushing the slide 50 from its center position to the right as shown in FIG. 7 releases the left pin 43 which is urged by its spring 41 into the position shown in FIG. 7. In such released position, the left pin 43 prevents movement of the slide 50 to the left, the slide 50 continuing to hold the right pin 43 up in opposition to its spring 41. Similarly, pushing the slide 50 from its center position to the left releases the right pin 43 while the left pin 43 continues to be held up in opposition to its spring 41. Hence, in the center position of the slide 50, both end pins 43 are held up as viewed in FIG. 7 in retracted positions in opposition to the springs 41, and in the side positions of the slide one or the other of the end pins 43 is released to move into its ejected position. The left hand pin 43 shown in FIG. 7 is in its released position. The center pin 53, as hereinafter described, functions as a means to shift the slide. Rounded ends 55 on the body members 37 function as rail followers as also hereinafter described.

Figure 1:
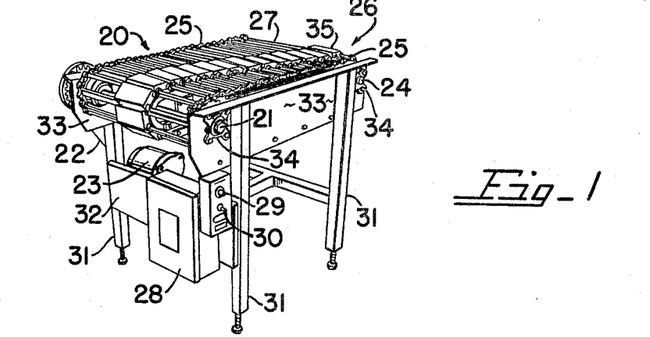
FIG. 1 is a perspetive view of a device embodying the present invention.

The end pins 43 function when they are released by the slide 50 to follow upper guide rails 56 (FIG. 5), each having a metal portion 57 and a plastic wear portion 58, and each having a straight section 59 and a curved section 60 which is arranged as shown in FIG. 5 to deliver articles to a side of the discharge end 26. When neither end pin 43 on a carrier 35 is released, no pin engagement with a rail 56 is made and the carriers 35 proceed down the center of the conveyor as shown by the upper two carriers 35 at the arrow in FIG. 5 (weight of article O.K.). However, when a right hand pin 43 as viewed in FIG. 5 is released, it engages the side of the right hand rail 56 where such rail 56 begins to curve toward the side of the conveyor and follows the rail 56 as shown by the two carriers 35 at the upper right hand side of FIG. 5 sliding the respective carrier 35 to the side of the conveyor (weight of article too large or too small). Similarly, when a left hand pin 43 is released, it engages the side of the left hand rail 56 where such rail 56 begins to curve toward the left side of the conveyor and follows the rail. Accordingly, articles, segregated according to weight (O.K., OVER and UNDER), are discharged onto the three endless take-away belts (not shown). As shown in FIG. 5, normally the released end pins 43 do not engage the straight sections 59 of the rails 56. Brackets 61 carried by square hollow tubes 62, extending between the side plates 33 (FIG. 1), support the rails 56, screws 63 connecting the rails 56 to the bracket 61. Hence, the upper guide rails extend along the forward path of the conveyor for guiding ejected end pins 43 and, thus, the carriers of such end pins to sides of the conveyor.

Under the article-discharging path of travel, a somewhat similar pair of rails 64 (FIG. 6) is provided, the brackets 61 which support the upper rails 56 also serving to support the lower rails 64. The rails 64 have a straight section 65 and a curved section 66. After the carriers 35 go around the discharge end 26 (FIG. 1), the rounded ends 55 of the carriers which have been displaced to the sides engage the curved sections of the rails 64 as shown in FIG. 6 and follow the curved rail sections 66 to centered positions between the straight rail sections 65. Normally, the rounded ends 55 of the carriers never touch discs 67 at the sides of the coveyor which turn with the idler shaft 24, but should a carrier be accidentally displaced too far laterally its rounded end engages a disc 67 which limits its lateral movement. The carriers 35 advance between the straight rail sections 66 with their rounded ends 55 sliding along the sides of the rails and are brought to an information station 68. Hence, the lower guide rails extend along the return path of the conveyor for gathering the carriers into single file and guide them to the information station.

Figure 3:
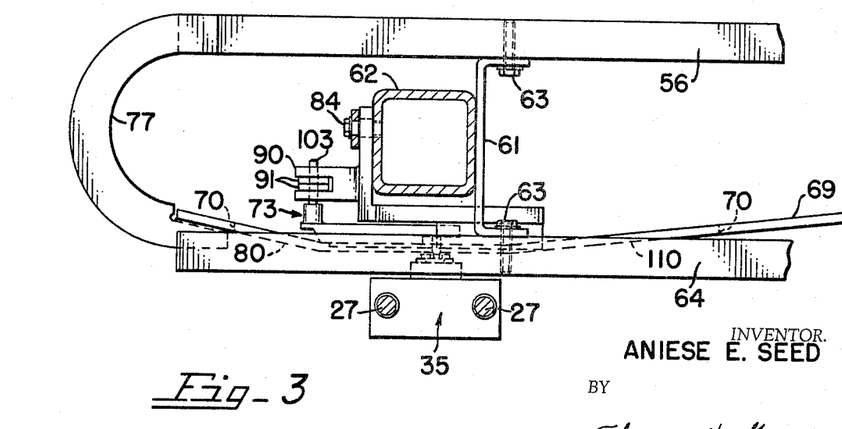
FIG. 3 is an enlarged, fragmentary elevational view of a part of the device shown in FIG. 1, with several parts shown in vertical section.
Figure 4:
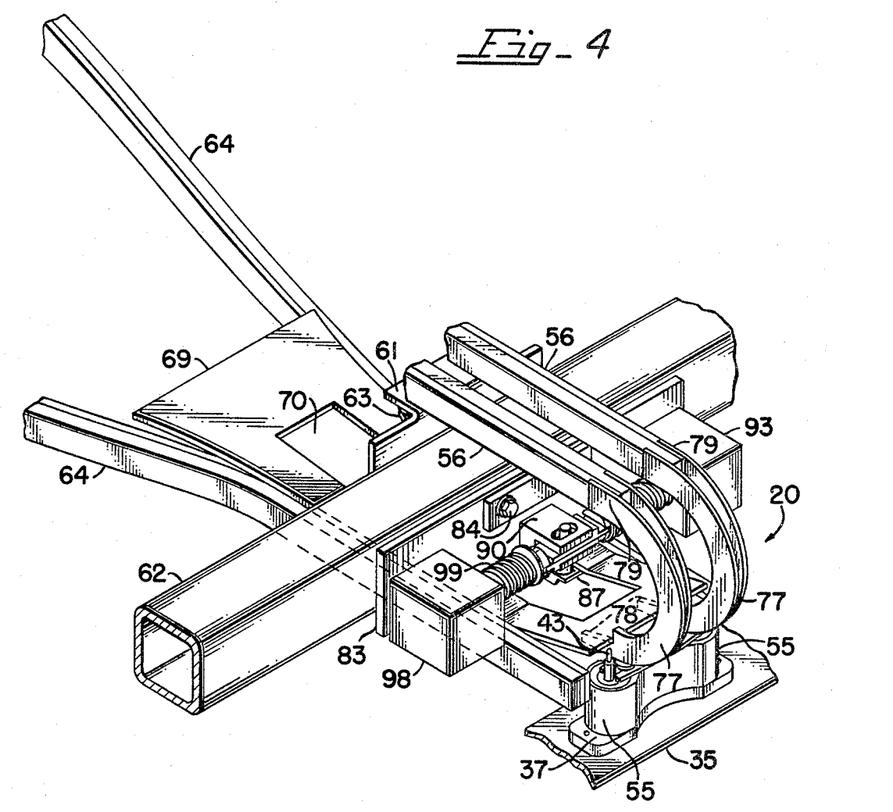
FIG. 4 is an enlarged, fragmentary perspective view of a part of the device shown in FIG. 1.

The information station 68 is defined by a large plate cam 69 which is shown in plan in FIG. 6, in side elevation in FIG. 3, and in perspective in FIG. 4. The plate cam 69 is provided with a large, elongated slot 70 through which the center carrier pins 53 pass without touching the plate cam 69 at any time. However, the carrier end pins 43 engage the plate cam 69 at a first step 110 (FIG. 3) and are gradually depressed, until in the position of the carrier 35 shown in FIG. 3, the end pins 43 are free of the slide 50, the slide 50 then being freely slidable on its carrier 35. Once the carrier 35 is centered and the end pins 43 are depressed free of the slide, the center pin 53 is centered by passing through a centering groove 71 in a stationarily mounted cam track member 72; it then passes through a switching device 73 as shown in FIG. 6. The plate cam 69 is carried by and for the most part between the lower rails 64 as best shown in FIG. 4.

The switching device 73 includes a solenoid-operated track 74 (FIGS. 10–12) which when rotated about a vertical axis 75 of a shoulder screw 76 moves any carrier center pin 53 which is located in the track to one side or the other, the slide 50 being freely movable at this time. Once the track 74 is rotated, it remains in its rotated position until four carriers 35 pass under it and then it returns to its home or centered position, four carriers 35 being used to convey one article (matter of choice). All the track 74 has to do is move the free slide 50 and not the carriers 35. Hence, little power is required in the solenoid operation. As described above, when the slide 50 is moved laterally one way or the other, one of the end pins 43 is uncovered. After passing by the switching device 73, the carriers 35 are guided further by their rounded ends 55 sliding on the sides of the lower rails 64 to ensure that a released end pin 43 enters its proper channel. This is best shown in FIGS. 4 and 6 that show the rounded ends 55 of the carriers 35 being guided until a released end pin 43 passes beyond the end of the plate cam 69 to the outside of curved plates 77 which are attached at their lower ends to the plate cam 69 at 78 (FIG. 4) and at their upper ends to the upper rails 56 at 79 (FIGS. 4 and 5). At their upper ends, the outer surfaces of the curved plates 77 are flush with the outer side surfaces of the upper rails 56 and shield the ends of the upper rails 56 from pin collisions. Although the curved plates 77 are shown in pairs with the plates 77 in each pair meeting at the apex of a triangle as seen in plan in FIG. 5, preferably the space between the plates is filled in solid to ensure that no pins get accidentally caught between such plates. However, in actual practice this has never happened. After passing through the switching device 73, any end pin 43 which has been released by its slide 50 is slowly allowed by a rise or step 80 (FIG. 3) on the plate cam 69 to extend out of its carrier. This prevents possible damaging snap action.

The carriers 35 move around the front end 20 of the conveyor, receive their packages, and proceed in the direction of the arrow shown in FIG. 5. As described above, the end pins 43 function when they are released to follow upper rails 56 (FIG. 5) to deliver the packages to a side of the discharge end 26. When neither end pin 43 is released, no pin engagement with a rail 56 is made and the carriers 35 proceed down the center of the conveyor. If a slide 50 is not fully moved to one side or the other after leaving the information station and for some reason an end pin 43 works free, the pin will still snap along its guide rail. It it works free onto a rail top surface, it will ride on the rail and its carrier will ride off as an O.K. weight carrier. This is not serious because three carriers remain to do the job (4 carriers 35 used per article).

Figure 10:
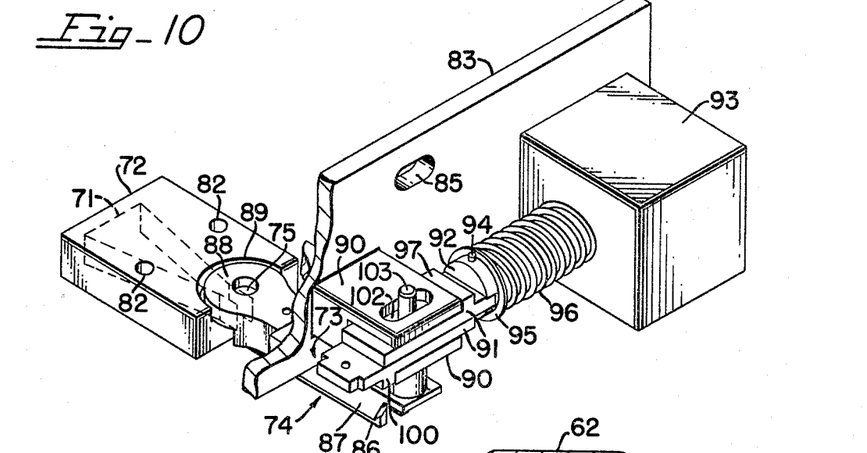
FIG. 10 is an enlarged, fragmentary perspective view of a portion of the device shown in FIG. 4.
Figure 11:
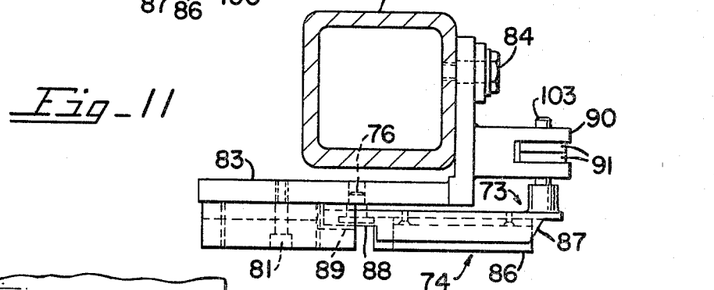
FIG. 11 is a side elevational view of a portion of the device shown in FIG. 10, with a support member not shown in FIG. 10 being shown in vertical section.
Figure 12:
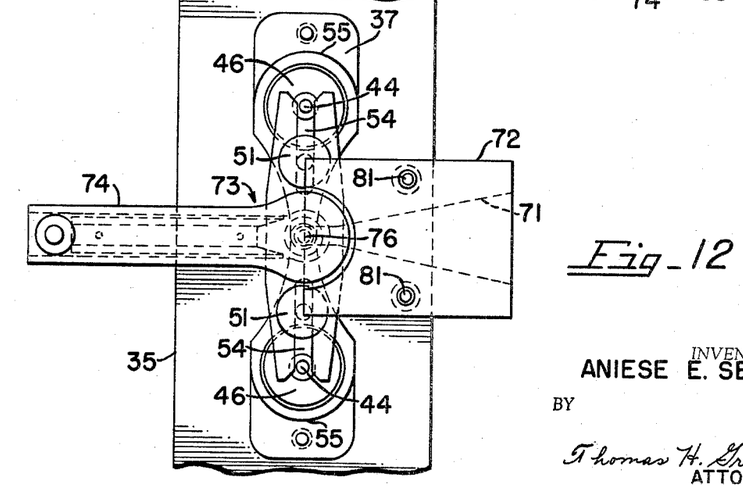
FIG. 12 is an enlarged, plan view of part of the device shown in FIG. 10, with the article carrier as shown in FIG. 9 included to illustrate the cooperation between the parts.

The track member 72 is fixed by means of screws 81 in holes 82 (FIGS. 10) to a bracket 83 (FIG. 11) carried by the square tube 62, the bracket 83 being attached to the tube 62 by means of a screw 84 that extends through an adjusting slot 85 (FIG. 10) in the bracket 83 and is threaded into the tube 62. The track 74 is pivotally mounted for rotation about the axis 75 of the shoulder screw 76 which is threaded into the bracket 83, the track 74 comprising an inner wear member 86 (FIG. 11) carried by an outer metallic member 87. As shown in FIGS. 10 and 11, the track 74 has a rounded head 88 which so mates with a similarly shaped depression 89 in the stationary track member 72 that the groove 71 in the track member 72 and the track 74 form one continuous track so that the center carrier pins 53 never collide with an obstruction. The bracket 83 includes a bifurcated extension 90 which receives a pair of plates 91.

Figure 2:
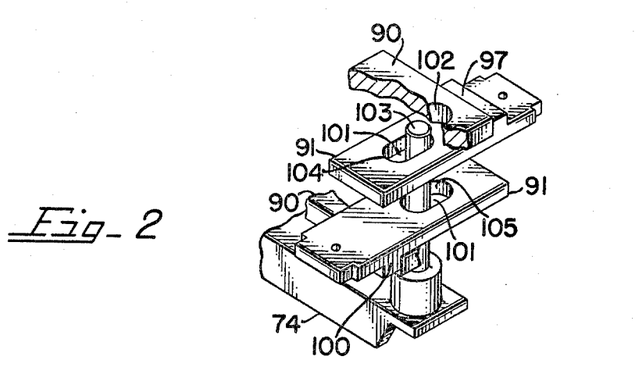
FIG. 2 is an enlarged, fragmentary, exploded, perspective view of a part of the device shown in FIG. 10.

The upper one of the plates 91 as viewed in FIG. 10 is connected to the plunger 92 of a solenoid 93, carried by the plate 83, by means of a pin 94 and abuts a washer 95 on the plunger which compresses a spring 96 between such washer and the solenoid 93. The spring 96, when the solenoid 93 is not energized, urges an abutment 97 on the upper plate 91 against the bracket extension 90 into a centered position. The lower one of the plates 91 similarly is connected to the plunger of a solenoid 98 (FIG. 4) carried by the plate 83, the plunger of the solenoid 98 being provided with a spring 99 which, when the solenoid 98 is energized, urges an abutment 100 against the bracket extension 90 into a centered position as shown in FIG. 10. The centered position of the two plates 91 also is shown in FIG. 2, each plate being provided with a horizontal slot 101 and the bifurcations of the bracket extension 90 also being provided with slots 102 which receive a vertical pin 103 extending upwardly from the pivotable track 74. The slot 101 in the upper plate 91 has a pin-engaging surface 104 and the slot 101 in the lower plate 91 has a pin-engaging surface 105 which pin-engaging surfaces 104 and 105 when the plates 91 are pulled toward their respective solenoids 93 and 98, when such solenoids are energized, pull the pin 103 toward the energized one of the solenoids to pivot the track 74 about the axis 75 of the shoulder screw 76. Similar pin-engaging surfaces at the opposite ends of the slots 101, when the plates 91 are resiliently returned to their center positions upon deenergization of the solenoids, pull the pin 103 to its centered position shown in FIG. 2. The pin 103 never engages the bracket 90 at the ends of the bracket slot 102, the plungers bottoming in the solenoids limiting movements of the plates 91 toward the solenoids.

The solenoids 93 and 98 are connected by means not shown to the weighing mechanism (not shown) in the same manner as the solenoids 52 and 54 are connected to the weighing mechanism shown in the above U.S. Patent No. 3,093,245 so that one of the solenoids 93 and 98 is energized when an article passing over the scale is overweight and the other of the solenoids 93 and 98 is energized when an article passing over the scale is underweight. Neither solenoid is energized when the article is of the correct weight. Articles within a given tolerance move along the segregating apparatus of the invention in a straight path, while those which are under- or overweight are diverted to other paths. However, the segregating apparatus need not be used with a weighing scale. The articles can be sorted according to size, color or any other characteristic. Other means than the solenoid-operated track 74 can be used for displacing the carriers 35 to the proper path. For example, the track 74 can be immobilized in its centered position so that, when the carriers reach their positions shown at the bottom of FIG. 5, all of the end pins 43 are in depressed positions. All that is needed to displace a carrier is a slight laterally directed nudge which can be provided by one's finger or a mechanically-driven cam. Such nudge will slide the carrier laterally along its tubes 24 until its center pin 53 strikes one of the rails 56, whereupon the respective end pin 43 will be released by its slide 50 to follow its rail 56 into a diverted path.

In operation, the article carriers 35 pass around the discharge end 26 of the conveyor and are gathered by the rails 64 as shown in FIG. 6 into a single file path which extends through the information station 68. The carrier end pins 43 engage the plate cam 69 and are gradually depressed releasing the slides 50 on the carriers 35 which are moved to centered positions, while they are released by the pins 43, by means of the centering groove 71 in the stationary track member 72 which cams the carrier center pins 53 into centered positions. The carrier center pins 53 then pass through the switching device 73 which, when it is moved by one of the solenoids 93 and 98 to a reject position, directs the slides 50 to a reject side releasing the respective carrier end pins 43 which are permitted to move out of their carriers slowly, under the influence of their springs 41, by the cam rise 80. A released end pin 43 is shown in FIG. 4 on the outside of one of the curved plates 77 ready to come around the front end 20 of the segregation device. The curved plate 77 ensures that the end pin 43 cannot strike the end of the upper rail. Normally, such end pin does not touch its curved plate 77 or the straight section 59 of its upper rail 56 as shown in FIG. 5. When neither end pin 43 on a carrier 35 is released, no pin engagement with a rail 56 is made and the carriers 35 proceed down the center of the conveyor (weight O.K., neither solenoid energized). However, when an end pin 43 is released (weight OVER or UNDER, one or the other of the solenoids energized), it engages the side of its rail 56 where such rail 56 begins to curve toward the side of the conveyor and follows the rail 56 as shown in FIG. 5. Accordingly, articles, segregated according to weight, are discharged onto the three take-away belts (not shown).

The principal feature of the segregation apparatus resides in the elimination of collisions between the carrier pins and parts of the segregating mechanism as occurs in prior segregating devices unless elaborate timing control circuits are employed. The carrier center pins 53 are gathered into centered positions by the mouth (best shown in FIG. 6) of the track member 72 and pass into the rounded head 88 of the track 74 which so cooperates with the track member 72 that there never is anything for the center pins 53 to collide with. After leaving the track 74, the center pins 53 proceed, as shown in FIG. 6, between the curved shield plates 77, then, as shown in FIG. 5, between the upper rails 56, and then, as shown in FIG. 6, between the lower rails 64. There are no open track ends or switching device ends for such center pins 53 to collide with. The carrier end pins 43 are spaced by the carriers 35 at all times from the bottom rails 64, as shown in FIG. 6, and when they are released by their slides 50, are positioned by the carriers still touching the lower rails 64, as shown in FIG. 4, on the outside of the curved plates 77 which shield the ends of the upper rails 56 from pin collisions. After passing the shielding curved plates 77, as shown in FIG. 6, there are no open track ends or switching device ends for such end pin 43 to collide with.

It is to be understood that the above description is illustrative of this invention and that various modifications thereof can be utilized without departing from its spirit and scope.

Having described the invention, I claim:

1. A segregation device comprising, in combination, an endless conveyor having loading and discharge ends, the conveyor moving in a forward path to the discharge end and in a return path to the loading end, a plurality of article carriers mounted on the conveyor for movement therewith and for lateral movement with respect thereto, each of the carriers including a laterally movable slide, two slidably mounted end pins, resilient means urging the end pins toward ejected positions, and a center pin on the slide intermediate the end pins, the slide having a center position wherein it holds the end pins in retracted positions in opposition to the resilient means and the end pins hold the slide in its center position and a side position wherein one of the end pins is released and the other end pin is maintained in said retracted position, cam means at the return path of the conveyor for depressing the end pins in opposition to the resilient means to release the slides, switch means engageable with the center pins for shifting the released slides into said side positions, whereby one of the end pins on every carrier having a slide in said side position is released and moved by the respective resilient means into said ejected position, upper guide rail means extending along the forward path of the conveyor for guiding ejected end pins and thus the carriers of such ejected end pins to a side of the conveyor, and lower guide rail means extending along the return path of the conveyor for gathering the carriers into single file and guiding them to the cam means.

2. A segregation device according to claim 1 wherein the cam means has a first step functioning for said depressing the end pins to release the slides and a second step functioning to limit the speed of movement of the end pins into said ejected positions.

3. A segregation device according to claim 1 wherein shield means are provided extending from the return path of the conveyor at said loading end to the upper guide rail means for shielding the ends of the upper guide rail means at said loading end from collisions.

4. A segregation device according to claim 1 wherein the cam means comprises a plate cam defining an elongated, centrally located opening through which the center carrier pins pass without touching the plate cam.

5. A segregation device according to claim 1 wherein additional cam means are provided for centering the center pins prior to engagement of the center pins with the switch means.

6. A segregation device according to claim 1 wherein the switch means is pivotably mounted, additional resilient means are provided for centering the switch means, and means are provided for pivoting the switch means in opposition to the additional resilient means for said shifting the released slides into said side positions.

7. An article carrier for a segregation device comprising, in combination, a body member, a slide carried by the body member, and means for latching the slide in a plurality of positions, said means including pin means mounted in the body member for movement generally perpendicular to the path in which the slide is slidable and resilient means urging the pin means toward ejected positions relative to the body member.

8. An article carrier for a segregation device comprising, in combination, a body member, a slidably mounted slide carried by the body member, two pins mounted in the body member for movement generally perpendicular to the path in which the slide is slidable, and resilient means urging the pins toward ejected positions relative to the body member, the slide having a first position wherein it holds the pins in retracted positions in opposition to the resilient means, the pins in turn holding the slide in said first position, and the slide having a second position wherein it continues to hold one of the pins in its retracted position and the other pin is released to be moved by the resilient means into said ejected position, said ejected pin preventing movement of the slide from said second position into said first position.

9. A switching device for segregation mechanism comprising, in combination, a stationarily mounted cam track defining a depression, a pivotably mounted track member having a rounded head received in the depression and movable in a first path, the combined track and track member forming one continuous unobstructed track, a pin extending generally perpendicular to the path, a plate member slidable in a second path generally parallel to the first path, one of the members carrying the pin and the other member defining a slot receiving the pin, and means for driving the plate member and thus for pivoting the track member.

10. A switching device for segregation mechanism comprising, in combination, a pivotably mounted track movable in a first path, a pin carried by the track extending generally perpendicular to the path, a plate slidable in a second path generally parallel to the first path and defining a slot receiving the pin, and means for driving the plate and thus for pivoting the track.

11. A segregation device comprising, in combination, an endless conveyor having loading and discharge ends, the conveyor moving in a forward path to the discharge end and in a return path to the loading end, a plurality of article carriers mounted on the conveyor for movement therewith and for lateral movement with respect thereto, each of the carriers including a body member, a slide carried by the body member, and means for latching the slide in a plurality of positions comprising a pin and resilient means urging the pin toward an ejected position relative to the body member, means for moving the slides relative to the carrier body members to release the pins for movements to said ejected positions, upper guide rail means extending along the forward path of the conveyor for guiding ejected pins and thus the carriers of such ejected pins to a side of the conveyor, and lower guide rail means extending along the return path of the conveyor for gathering the carriers into single file.

12. A segregation device comprising, in combination, an endless conveyor having loading and discharge ends, the conveyor moving in a forward path to the discharge end and in a return path to the loading end, a plurality of article carriers mounted on the conveyor for movement therewith and for lateral movement with respect thereto, each of the carriers including a body member, a slide carried by the body member and movable relative to the body member in a lateral path, and two end pins mounted in the body member for movement in a path generally perpendicular to said lateral path, and resilient means urging the end pins toward the slide, the slide having a center position wherein it holds the pins in retracted positions in opposition to the resilient means and a side position wherein one of the pins is released and the other pin is maintained in said retracted position, means for moving the slides relative to the carrier body members to said side positions, whereby one of the pins on every carrier having a slide in said side position is released and moved by the respective resilient means into said ejected position, upper guide rail means extending along the forward path of the conveyor for guiding ejected end pins and thus the carriers of such ejected end pins to a side of the conveyor, and lower guide rail means extending along the return path of the conveyor for gathering the carriers into single file as they approach the loading end.

13. A segregation device comprising, in combination, an endless conveyor having loading and discharge ends, the conveyor moving in a forward path to the discharge end and in a return path to the loading end, a plurality of article carriers mounted on the conveyor for movement therewith and for lateral movement with respect thereto, each of the carriers including a slide movable relative to the rest of the carrier in a lateral path, two end pins mounted to move in a path generally perpendicular to said lateral path, resilient means urging the end pins toward ejected positions, and a center pin on the slide intermediate the end pins, the slide having a first position wherein it holds the end pins in retracted positions in opposition to the resilient means and a second position wherein one of the end pins is released and the other end pin is maintained in said retracted position, first cam means at the return path of the conveyor for depressing the end pins in opposition to the resilient means, second cam means adjacent the first cam means for engaging center pins and moving slides into their said first positions, switch means adjacent the second cam means for engaging center pins and shifting the slides into said side positions, whereby one of the end pins on every carrier having a slide in said side position is released and moved by the respective resilient means into said ejected position, and means for guiding ejected end pins and thus the carriers of such ejected end pins to a side of the forward conveyor path and for gathering the carriers into single file and returning them to the first cam means.

14. A segregation device comprising, in combination, an endless conveyor having loading and discharge ends, the conveyor moving in a forward path to the discharge end and in a return path to the loading end, a plurality of article carriers mounted on the conveyor for movement therewith and for lateral movement with respect thereto, each of the carriers including a slide, resilient means, two movable cam follower means biased by the resilient means for latching the slide in center and side positions, both cam follower means being held in retracted positions in opposition to the resilient means by the slide when it is in its center position and one cam follower means being held in said retracted position and the other cam follower means being driven by the resilient means into an ejected position when the slide is in said side position, first cam means at the return path of the conveyor for depressing the cam follower means in opposition to the resilient means to unlatch the slides, second cam means for moving unlatched slides into said center positions, switch means adjacent the second cam means for shifting the centered slides into said side positions, whereby one of the cam follower means on every carrier having a slide in said side position is moved by the respective resilient means into said ejected position, and guide means for guiding ejected cam follower means and thus the carriers of such ejected cam follower means to a side of the forward conveyor path and for then guiding the carriers to said first cam means.

15. A segregation device according to claim 14 wherein the first cam means has a step functioning to limit the speed of ejection of the cam follower means.

16. A segregation device according to claim 14 wherein shield means are provided extending from the return path of the conveyor at said loading end to the guide means for shielding the guide means from collisions.

References Cited by the Examiner
UNITED STATES PATENTS

| | | | |
|---|---|---|---|
| 2,441,292 | 5/1958 | Schroeder | 193—22 |
| 2,805,760 | 9/1957 | Von Stroh | 198—92 |
| 3,129,803 | 4/1964 | Guilie | 198—31 |

EVON C. BLUNK, *Primary Examiner.*

RICHARD E. AEGERTER, *Examiner.*